United States Patent
Lunttila et al.

(10) Patent No.: US 11,229,025 B2
(45) Date of Patent: Jan. 18, 2022

(54) UPLINK ALLOCATION ON UNLICENSED SPECTRUM

(71) Applicant: NOKIA TECHNOLOGIES OY, Espoo (FI)

(72) Inventors: Timo Erkki Lunttila, Espoo (FI); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/497,048

(22) PCT Filed: Mar. 24, 2017

(86) PCT No.: PCT/EP2017/057086
§ 371 (c)(1),
(2) Date: Sep. 24, 2019

(87) PCT Pub. No.: WO2018/171898
PCT Pub. Date: Sep. 27, 2018

(65) Prior Publication Data
US 2020/0383108 A1    Dec. 3, 2020

(51) Int. Cl.
*H04W 72/14*    (2009.01)
*H04W 72/04*    (2009.01)

(52) U.S. Cl.
CPC .............. *H04W 72/0446* (2013.01); *H04W 72/0413* (2013.01)

(58) Field of Classification Search
CPC .............. H04W 72/0446; H04W 72/0413
See application file for complete search history.

(56) References Cited

U.S. PATENT DOCUMENTS

2014/0362780 A1* 12/2014 Malladi ............ H04W 72/1231
                                                    370/329
2016/0278049 A1    9/2016 Nory et al.
(Continued)

FOREIGN PATENT DOCUMENTS

EP    3 297 312 A1    3/2018
JP    2016-524421 A    8/2016
(Continued)

OTHER PUBLICATIONS

International Search Report & Written Opinion dated Nov. 29, 2017 corresponding to International Patent Application No. PCT/EP2017/057086.
(Continued)

*Primary Examiner* — Barry W Taylor
(74) *Attorney, Agent, or Firm* — Squire Patton Boggs (US) LLP (57) ABSTRACT

It is provided a method, comprising checking if an option grant for an uplink transmission is received, wherein the option grant comprises, for a subframe, a first allocation option to start the uplink transmission and a second allocation option to start the uplink transmission, wherein the first allocation option is earlier in the subframe than the second allocation option; deciding if the uplink transmission is allowed at the first allocation option; starting the uplink transmission at the first allocation option if the option grant is received and the uplink transmission is allowed at the first allocation option; deciding if the uplink transmission is allowed at the second allocation option; starting the uplink transmission at the second allocation option if the option grant is received, the uplink transmission is not allowed at the first allocation option, and the uplink transmission is allowed at the second allocation option.

20 Claims, 2 Drawing Sheets

(56) References Cited

U.S. PATENT DOCUMENTS

| | | | |
|---|---|---|---|
| 2016/0278050 A1 | 9/2016 | Nory et al. | |
| 2017/0223677 A1* | 8/2017 | Dinan | H04L 27/0006 |
| 2017/0223728 A1* | 8/2017 | Luo | H04L 5/0053 |
| 2018/0048498 A1* | 2/2018 | Stern-Berkowitz | H04W 16/14 |
| 2018/0083745 A1* | 3/2018 | Sun | H04L 5/005 |
| 2018/0191547 A1* | 7/2018 | Mukherjee | H04W 72/0446 |
| 2018/0199359 A1* | 7/2018 | Cao | H04L 5/0012 |

FOREIGN PATENT DOCUMENTS

| | | |
|---|---|---|
| WO | 2016/164465 A1 | 10/2016 |
| WO | 2016/186002 A1 | 11/2016 |
| WO | 2017/032619 A1 | 3/2017 |

OTHER PUBLICATIONS

3GPP TS 36.212 V14.0.0 (Sep. 2016), Technical Specification, 3rd Generation Partnership Project; Technical Specification Group Radio Access Network; Evolved Universal Terrestrial Radio Access (E-UTRA); Multiplexing and channel coding (Release 14), Sep. 2016.

Nokia et al: "New Work Item on Enhancements to LTE operation in unlicensed spectrum," 3GPP Draft; RP-170835, 3GPP TSG RAN Meeting #75, Dubrovnik, Croatia, Mar. 2017.

Notification of Ground of Rejection dated Oct. 5, 2020 corresponding to Japanese Patent Application No. 2019-552214, and English translation thereof.

Ericsson, Panasonic, "MCS Table for Initial Partial TTI in LAA," R1-163508; 3GPP TSG-RAN WG1#84bis, Busan, Korea, Apr. 11-15, 2016.

Nokia, Alcatel-Lucent Shanghai Bell, "Multiple starting and ending positions in a subframe for UI," R1-1704804; 3GPP TSG-RAN1 #88bis, Spokane, US, Apr. 3-7, 2017.

Nokia, Ericsson, Intel, Qualcomm, "New Work Item on Enhancements to LTE operation in unlicensed speclium," RP-170848, 3GPP TSG RAN Meeting #75, Dubrovnik, Croatia, Mar. 6-9, 2017.

Notice of Preliminary Rejection dated Nov. 27, 2020 corresponding to Korean Patent Application No. 2019-7031294, along with concise statement of relevance.

Indian Office Action corresponding to IN Application No. 201947039187, dated Jun. 16, 2021.

* cited by examiner

UPLINK ALLOCATION ON UNLICENSED SPECTRUM

FIELD OF THE INVENTION

The present invention relates to an apparatus, a method, and a computer program product related to uplink scheduling. More particularly, the present invention relates to an apparatus, a method, and a computer program product related to uplink scheduling, e.g. in an unlicensed spectrum.

ABBREVIATIONS

3GPP 3$^{rd}$ Generation Partnership Project
ACK Acknowledgement
CCA Clear Channel Assessment
CCA Clear Channel Assessment
DCI Downlink Control Information
DL Downlink
DMRS Demodulation Reference Signal
eLAA enhanced LAA
eNB Enhanced NodeB
FDD Frequency Division Duplexing
feLAA Further enhancement LAA
FS Frame structure type
GPRS Generic Packet Radio Service
HARQ Hybrid Automatic Retransmission request
ID Identifier
LAA Licensed Assisted Access
LBT Listen before Talk
LTE Long Term Evolution
LTE-A LTE Advanced
MCS Modulation and Coding Scheme
NACK Negative acknowledgement
OFDM Orthogonal Frequency Division Multiplexing
PCell Primary Cell
PDCCH Physical Downlink Control Channel
PDSCH Physical Downlink Shared Channel
PRB Physical Resource Block
PUCCH Physical Uplink Control Channel
PUSCH Physical Uplink Shared Channel
QAM Quadrature Amplitude Modulation
QPSK Quadrature Phase Shift Keying
RAN Radio Access Network
RE Resource Element
Rel Release
RRC Radio Resource Control
UpPTS Uplink Pilot Time Slot
RV Redundancy Version
SCell Secondary Cell
SC-FDMA Single Carrier Frequency Division Multiple Access
SF Subframe
sPDSCH Short PDSCH
sPUCCH Short PUCCH
sPUSCH Short PUSCH
SRS Sounding Reference Signal
sTTI Short Transmission Time Interval
sym Symbol
TA Timing Advance
TBS Transport Block Size (in terms of number of bits)
TDD Time Division Duplexing
TS Technical Specification
TTI Transmission Time Interval
UCI Uplink Control Information
UE User Equipment
UL Uplink
UpPTS Uplink Pilot Timeslot
WG Working Group
WiFi Wireless Fidelity

BACKGROUND OF THE INVENTION

LTE-Advanced Pro system will be part of 3GPP LTE Rel-15. It comprises LTE operation on unlicensed carriers. The description of Rel-15 Work Item "Enhancements to LTE operation in unlicensed spectrum" was agreed in March 2017. It is in defined in 3GPP RP-170835.
Some key objectives of this work item are as follows:
Specify support for multiple starting and ending positions in a subframe for UL and DL on SCell with Frame structure type 3. [RAN1, RAN2, RAN4]
(Starting in RAN1 #90): Study, and specify if needed, support for autonomous uplink access with Frame Structure type 3 considering solutions from the L2 latency reduction work item [RAN1, RAN2, RAN4]
The work item "Enhancements to LTE operation in unlicensed spectrum" only supports licensed assisted access, where the Primary Cell (PCell) in carrier aggregation must be located on a licensed spectrum, aggregated with one or more LAA Secondary Cells (SCells) on unlicensed spectrum.
LTE standalone operation on unlicensed spectrum means that eNodeB/UE air interface relies solely on unlicensed spectrum without any carrier on licensed spectrum. LTE-based technology supporting network's stand-alone operation on unlicensed carriers is currently developed by MulteFire Alliance.
In LTE, UL transmission of information bits is performed in PUSCH. The time is divided in subframes, wherein each subframe comprises 14 symbols (sym #0 to sym #13). Each subframe comprises 2 slots, each comprising 7 symbols (slot #0 comprising sym #0 to sym #6, and slot #1 comprising sym #7 to sym #13). One symbol of each slot comprises a reference signal. In addition, each slot may comprise symbols for control purposes such as Ack/Nack, for rank indicator (RI), cell quality indicator (CQI), and Pre-coding matrix indicator (PMI). The other symbols of the subframe may be used for carrying payload (information bits). Thus, control data and payload data are multiplexed on each slot.
In conventional LTE (Licensed band operation, FDD), UL transmissions start always at the subframe boundary. For LTE TDD (i.e. Frame Structure Type 2), Rel-14 introduced also support for UL transmissions in UpPTS part of a special subframe. In such case, the UL starting position (defined by the UpPTS length) is semi-statically indicated or configured to the UE along with the enabling of the feature.
In the case of LTE unlicensed band operation (Licensed Assisted Access, LAA), the starting point of the Rel-14 eLAA UL transmissions can vary between the start of a subframe and the second SC-FDMA symbol of a subframe. Four different starting points are supported, and any one of them can be indicated to the UE with a two-bit field included in the UL DCI formats 0A/0B/4A/4B as shown in Table 1:

TABLE 1 eLAA PUSCH starting position (taken from 3GPP TS 36.212, v.14.0.0, Table 5.3.3.1.1A-1)

| Value | PUSCH starting position |
| --- | --- |
| 00 | symbol 0 |
| 01 | 25 µs in symbol 0 |

TABLE 1-continued eLAA PUSCH starting position (taken from 3GPP
TS 36.212, v.14.0.0, Table 5.3.3.1.1A-1)

| Value | PUSCH starting position |
|---|---|
| 10 | (25 + TA) μs in symbol 0 |
| 11 | symbol 1 |

Similarly, mainly for the purpose of making room for SRS transmission, there is an option to indicate with one bit in the UL grant whether a PUSCH transmission shall stop at the end of the subframe (after symbol #13), or one symbol earlier (after symbol #12).

The UL starting points in Rel-14 eLAA are limited to the ones indicated in Table 1, and the transmission ends after the last or penultimate symbol of a subframe. A UE can only have a single UL grant for a given subframe/TTI.

One of the key design targets for LTE operation on unlicensed spectrum is fair co-existence with other radio nodes and technologies, including in particular WiFi. For this reason, the channel access procedure (i.e. listen-before-talk) applied to LTE is essentially the same as in WiFi. This allows for fair co-existence with WiFi, at least when a relatively large amount of data is transmitted. However, in the case of small data packets, the minimum transmission duration of (close to) 1 ms means that a UE may from time to time occupy the operating channel longer than a WiFi node transmitting similar amount of data would do.

Furthermore, autonomous (i.e. grant-less, or semi-persistently scheduled) UL transmissions are currently under study in MulteFire Alliance and are part of the Rel. 15 "Enhancements to LTE operation in unlicensed spectrum" work item in 3GPP as well. In autonomous UL operation, limiting the starting point of UL transmission to only the start of the subframe (1 ms interval) means that the chances of being able to access the channel are reduced compared to e.g. WiFi. For these reasons there is a need to support multiple UL starting points in a subframe on LAA SCells.

One possible way to specify support for multiple UL starting points in a subframe would be to extend the support of short TTIs (sTTI) to cover LTE LAA/Frames Structure Type 3, too (currently the work is only considering LTE FDD/FS1 and LTE TDD/FS2). However, supporting sTTI on unlicensed carriers is not a trivial task, since e.g. the UEs may not be able to easily synchronize to very short transmissions. Furthermore, the shortest sTTI lengths (of 2-3 symbols) in the DL might not even have common reference signals, and in the UL the reference signals overhead might easily become excessive.

Short TTIs, considered as part of LTE latency reduction work, could in principle provide similar functionality as transmission start/stop at symbols different from the subframe boundary. However, they require considerable changes to LTE air interface, which does not seem to be well motivated for the simple purpose of more efficient utilization of unlicensed spectrum. Nevertheless, the UL structure of the 7-symbol/slot long sTTI design may be used to provide the physical layer structure of the partial UL subframe for MulteFire/further enhancements to eLAA.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to perform at least scheduling a first uplink transmission of a terminal by an option grant comprising, for a first subframe, a first allocation option to start the first uplink transmission and a second allocation option to start the first uplink transmission, wherein the first allocation option is earlier in the first subframe than the second allocation option; checking if the first uplink transmission is received at the first allocation option; and checking if the first uplink transmission is received at the second allocation option if the first uplink transmission is not received at the first allocation option; instructing to process the first uplink transmission if the first uplink transmission is received at one of the first allocation option and the second allocation option.

The at least one memory and the computer program code may be arranged to cause the apparatus to further perform scheduling a second uplink transmission of the terminal by a non-option grant comprising, for a second subframe, only one third allocation option to start the second uplink transmission; and causing reception of the second uplink transmission.

The at least one memory and the computer program code may be arranged to cause the apparatus to further perform indicating, to the terminal, at least one of that the first uplink transmission is scheduled using a signaling scheme supporting transmission of option grants and that the second uplink transmission is scheduled using a signaling scheme not supporting transmission of option grants.

The at least one memory and the computer program code may be arranged to cause the apparatus to further perform instructing the terminal to transmit a first number of information bits modulated by a first modulation order in the first uplink transmission if the terminal transmits the first uplink transmission at the first allocation option; instructing the terminal to transmit a second number of information bits modulated by a second modulation order in the first uplink transmission if the terminal transmits the first uplink transmission at the second allocation option; instructing to demodulate the first number of information bits received in the first uplink transmission with the first modulation order if the first uplink transmission is received at the first allocation option; and instructing to demodulate the second number of information bits received in the first uplink transmission with the second modulation order if the first uplink transmission is received at the second allocation option; wherein the second modulation order may be equal to or higher than the first modulation order, and the second number may be smaller than the first number. The first modulation order may be equal to the second modulation order.

The at least one memory and the computer program code may be arranged to cause the apparatus to further perform instructing the terminal to transmit a third number of information bits modulated by a third modulation order in the first uplink transmission if the terminal transmits the first uplink transmission at the first allocation option; instructing the terminal to transmit a fourth number of information bits modulated by a fourth modulation order in the first uplink transmission if the terminal transmits the first uplink transmission at the second allocation option; instructing to demodulate the third number of information bits received in the first uplink transmission with the third modulation order if the first uplink transmission is received at the first allocation option; and instructing to demodulate the fourth number of information bits received in the first uplink transmission with the fourth modulation order if the first uplink transmission is received at the second allocation option; wherein the fourth modulation order may be higher than the third modulation order, and the fourth number may be equal to or smaller than the third number. The third number may be equal to the fourth number.

According to a second aspect of the invention, there is provided an apparatus, comprising at least one processor, at least one memory including computer program code, and the at least one processor, with the at least one memory and the computer program code, being arranged to cause the apparatus to at least perform at least checking if an option grant for an uplink transmission is received, wherein the option grant comprises, for a subframe, a first allocation option to start the uplink transmission and a second allocation option to start the uplink transmission, wherein the first allocation option is earlier in the subframe than the second allocation option; deciding if the uplink transmission is allowed at the first allocation option; starting the uplink transmission at the first allocation option if the option grant is received and the uplink transmission is allowed at the first allocation option; deciding if the uplink transmission is allowed at the second allocation option; starting the uplink transmission at the second allocation option if the option grant is received, the uplink transmission is not allowed at the first allocation option, and the uplink transmission is allowed at the second allocation option.

The at least one memory and the computer program code may be arranged to cause the apparatus to further perform at least one of listening if a resource for the uplink transmission is free at the first allocation option, wherein the deciding if the uplink transmission is allowed at the first allocation option decides that the uplink transmission is allowed at the first allocation option if the resource for the uplink transmission is free at the first allocation option; and listening if the resource for the uplink transmission is free at the second allocation option, wherein the deciding if the uplink transmission is allowed at the second allocation option decides that the uplink transmission is allowed at the second allocation option if the resource for the uplink transmission is free at the second allocation option.

The at least one memory and the computer program code may be arranged to cause the apparatus to further perform monitoring if an indication is received, wherein the indication indicates that a base station controlling the uplink transmission does not provide the option grant; inhibiting the checking if the option grant is received if the indication is received.

The at least one memory and the computer program code may be arranged to cause the apparatus to further perform transmitting a first number of information bits with a first modulation order in the uplink transmission of the subframe if the uplink transmission is started at the first allocation option; transmitting a second number of information bits with a second modulation order in the uplink transmission of the subframe if the uplink transmission is started at the second allocation option; wherein the second modulation order may be equal to or higher than the first modulation order, and the second number may be smaller than the first number. The first modulation order may be equal to the second modulation order.

The at least one memory and the computer program code may be arranged to cause the apparatus to further perform modulating the uplink transmission of a third number of information bits with a third modulation order if the uplink transmission starts at the first allocation option; and modulating the uplink transmission of a fourth number of information bits with a fourth modulation order if the uplink transmission starts at the second allocation option, wherein the fourth modulation order may be higher than the third modulation order, and the fourth number may be equal to or smaller than the third number. The third number may be equal to the fourth number.

According to a third aspect of the invention, there is provided a method, comprising scheduling a first uplink transmission of a terminal by an option grant comprising, for a first subframe, a first allocation option to start the first uplink transmission and a second allocation option to start the first uplink transmission, wherein the first allocation option is earlier in the first subframe than the second allocation option; checking if the first uplink transmission is received at the first allocation option; and checking if the first uplink transmission is received at the second allocation option if the first uplink transmission is not received at the first allocation option; instructing to process the first uplink transmission if the first uplink transmission is received at one of the first allocation option and the second allocation option.

The method may further comprise scheduling a second uplink transmission of the terminal by a non-option grant comprising, for a second subframe, only one third allocation option to start the second uplink transmission; and causing reception of the second uplink transmission.

The method may further comprise indicating, to the terminal, at least one of that the first uplink transmission is scheduled using a signaling scheme supporting transmission of option grants and that the second uplink transmission is scheduled using a signaling scheme not supporting transmission of option grants.

The method may further comprise instructing the terminal to transmit a first number of information bits modulated by a first modulation order in the first uplink transmission if the terminal transmits the first uplink transmission at the first allocation option; instructing the terminal to transmit a second number of information bits modulated by a second modulation order in the first uplink transmission if the terminal transmits the first uplink transmission at the second allocation option; instructing to demodulate the first number of information bits received in the first uplink transmission with the first modulation order if the first uplink transmission is received at the first allocation option; and instructing to demodulate the second number of information bits received in the first uplink transmission with the second modulation order if the first uplink transmission is received at the second allocation option; wherein the second modulation order may be equal to or higher than the first modulation order, and the second number may be smaller than the first number. The first modulation order may be equal to the second modulation order.

The method may further comprise instructing the terminal to transmit a third number of information bits modulated by a third modulation order in the first uplink transmission if the terminal transmits the first uplink transmission at the first allocation option; instructing the terminal to transmit a fourth number of information bits modulated by a fourth modulation order in the first uplink transmission if the terminal transmits the first uplink transmission at the second allocation option; instructing to demodulate the third number of information bits received in the first uplink transmission with the third modulation order if the first uplink transmission is received at the first allocation option; and instructing to demodulate the fourth number of information bits received in the first uplink transmission with the fourth modulation order if the first uplink transmission is received at the second allocation option; wherein the fourth modulation order may be higher than the third modulation order, and the fourth number may be equal to or smaller than the third number. The third number may be equal to the fourth number.

According to a fourth aspect of the invention, there is provided a method, comprising checking if an option grant for an uplink transmission is received, wherein the option grant comprises, for a subframe, a first allocation option to start the uplink transmission and a second allocation option to start the uplink transmission, wherein the first allocation option is earlier in the subframe than the second allocation option; deciding if the uplink transmission is allowed at the first allocation option; starting the uplink transmission at the first allocation option if the option grant is received and the uplink transmission is allowed at the first allocation option; deciding if the uplink transmission is allowed at the second allocation option; starting the uplink transmission at the second allocation option if the option grant is received, the uplink transmission is not allowed at the first allocation option, and the uplink transmission is allowed at the second allocation option.

The method may further comprise listening if a resource for the uplink transmission is free at the first allocation option, wherein the deciding if the uplink transmission is allowed at the first allocation option decides that the uplink transmission is allowed at the first allocation option if the resource for the uplink transmission is free at the first allocation option; and listening if the resource for the uplink transmission is free at the second allocation option, wherein the deciding if the uplink transmission is allowed at the second allocation option decides that the uplink transmission is allowed at the second allocation option if the resource for the uplink transmission is free at the second allocation option.

The method may further comprise monitoring if an indication is received, wherein the indication indicates that a base station controlling the uplink transmission does not provide the option grant; inhibiting the checking if the option grant is received if the indication is received.

The method may further comprise transmitting a first number of information bits with a first modulation order in the uplink transmission of the subframe if the uplink transmission is started at the first allocation option; transmitting a second number of information bits with a second modulation order in the uplink transmission of the subframe if the uplink transmission is started at the second allocation option; wherein the second modulation order may be equal to or higher than the first modulation order, and the second number may be smaller than the first number. The first modulation order may be equal to the second modulation order.

The method may further comprise modulating the uplink transmission of a third number of information bits with a third modulation order if the uplink transmission starts at the first allocation option; and modulating the uplink transmission of a fourth number of information bits with a fourth modulation order if the uplink transmission starts at the second allocation option, wherein the fourth modulation order may be higher than the third modulation order, and the fourth number may be equal to or smaller than the third number. The third number may be equal to the fourth number.

Each of the methods of the third and fourth aspects may be a method of uplink allocation. According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
spectrum efficiency is increased, in particular in unlicensed spectrum because the UE may have plural allocation options for an uplink transmission in the subframe;
interference towards other devices or access point operating on unlicensed spectrum is minimized as the transmission duration can be set to be very short in cases when only little data needs to be sent;
system complexity is kept low.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of this invention report provide a solution for indicating multiple uplink starting positions or ending positions for the UE, taking also into account autonomous UL access ($2^{nd}$ main objective of the work item Enhancements to LTE operation in unlicensed spectrum), as well as the regulatory requirements such as the need to perform listen-before-talk procedure. In particular, some embodiments of this invention provide a solution for starting and/or ending UL transmissions in the middle of a subframe, thereby reducing interference towards other nodes operating on unlicensed spectrum, and enhancing the possibility of accessing the channel.

Terminology:

In the following, the following terminology is used:

Partial starting subframe: a subframe where the transmission starts after SC-FDMA symbol #0, e.g. at the beginning of the second slot (i.e. at symbol #7 of the subframe)

Partial ending subframe: a subframe where the transmission ends before SC-FDMA symbol #13, e.g. after the 1$^{st}$ slot (i.e. after symbol #6 of the subframe)

Partial subframe: a subframe that is at least one of a partial starting subframe and a partial ending subframe.

Some embodiments of this invention provide signalling support for partial starting (e.g. starting during slot #1) and ending UL subframe (e.g. ending during slot #0). More specifically, according to some embodiments of the invention, the eNB grants the UL resources to the UE in a conditional manner, such that a single UL grant may indicate the UE resources with two or more different starting points (and potentially also with two or more different ending points) even during the same subframe and same TTI, but the UE may utilize only one of those for its transmission. The UE may choose which one it uses, e.g. based on the outcome of the LBT operation. Such a grant is also named "option grant", whereas a grant fixedly defining starting point and ending point of the transmission is also named "non-option grant".

In some embodiments, one additional bit is added into the UL grants (UL DCI format 0A/4a) to indicate that the Rel-14 bit fields for UL starting and ending symbol should be interpreted differently. This principle is illustrated in Tables 2a and 2b. Table 2a (left side) shows the Rel. 14 LTE LAA behaviour. If only this kind of uplink grants (non-option grant) may be used (Rel. 14 LTE LAA behaviour), the additional bit is set to 0. In contrast to that, Table 2b (right side) shows a corresponding state table according to some embodiments of the invention. Here, the additional bit in the DCI is set to "1", indicating that the UL grant may be an "option grant". In the example of Table 3, the states 110 and 111 indicate option grants.

TABLE 2

State tables of uplink grant: (a) LTE LAA Release 14 behaviour; (b) an exemplary signalling solution according to some embodiments of the invention.

| "0" (Rel-14 behaviour) | | "1" (new behaviour) | |
|---|---|---|---|
| start bits | | start and end bits | |
| 00 | sym #0 | 000 | start sym #0, end sym #6 |
| 01 | 25 μs | 001 | start #0 + 25 μs, end sym #6 |
| 10 | 25-TA | 010 | start #0 + 25 μs −TA, end sym #6 |
| 11 | sym #1 | 011 | start sym #1, end sym #6 |
|  | end bit | 100 | start sym #7, end sym #12 |
| 0 | sym #12 | 101 | start sym #7, end sym #13 |
| 1 | sym #13 | 110 | state 000 OR state 101 |
|  |  | 111 | full subframe (start sym#0, end sym#13) OR state 101 |
| (a) | | (b) | |

In the example embodiment of Table 2b, state "110" grants two partial subframes for the UE (namely, state 000 or state 101), but the UE is only allowed to use one of them for its transmission. State "111" grants either full subframe or partial starting subframe (state 101) for the UE. The UE may only use one of them for its transmission. That is, states 110 and 111 indicate option grants.

In case the UL grant gives conditionally resources for multiple UL (partial) subframe allocation options in a subframe (i.e. if the grant is an option grant), in one embodiment the transmission parameters such as resource allocation, MCS/TBS, HARQ process ID, redundancy version etc. are common for both allocation options.

As can be seen from the example in Table 1, basically the same number of bits (i.e. 3 bits in total) are used in Rel. 14 for UL subframe (i.e. 1 ms) scheduling granularity (Table 2a) as well as in the example for the new scheduling behaviour enabling to schedule UL partial starting and/or partial ending subframe, e.g. for further enhanced LTE LAA/MulteFire (in Table 2b). Therefore, according to some embodiments of the invention, one additional 1-bit differentiation flag is added to the UL DCI to differentiate the Rel. 14 LTE eLAA from the new behaviour according to some embodiments of the invention.

In some embodiments, the resource allocation options (in time/symbol domain) may be overlapping. One such example is the state "111" in Table 2b. As one example, the eNodeB may assign to the UE e.g.

a Rel. 14 eLAA UL subframe, starting from e.g. symbol #0 or symbol #1, and ending after symbol #12 or symbol #13. Table 2b, state 111, shows as an example starting symbol #0, ending symbol #13.

a partial starting subframe, starting from symbol #7

Again, the UE is allowed to use only one of the two allocation options. For example, the partial starting subframe is transmitted only if the UE cannot transmit the full subframe, e.g. due to the operating channel being busy.

In detail, according to some embodiments of the invention, the eNB may operate as follows:

1. Configure the UE for UL transmission with the new behaviour, i.e. informing the UE that option grants may be issued This may include e.g. including an additional bit into the relevant UL DCI formats to differentiate between Rel-14 indication of PUSCH starting and ending symbol, and the new behaviour described in Table 2b.

The configuration is preferably performed using RRC signalling

2. Schedule the UE for PUSCH transmission with an UL grant

The UL grant may be either a dynamic one, signalled in each subframe, or a semi-persistent grant which is valid for an extended period of time (e.g. in every n$^{th}$ subframe)

The scheduling grant may also include an indication of what type of listen-before-talk or channel access procedure the UE shall perform before being allowed to transmit.

A single bit in the UL grant differentiates whether the UL resource allocation:

is applied as in Rel-14 (i.e. resources are granted for a full subframe, or at least 12 SC-FDMA symbols) or, follows a new resource behaviour where e.g. a 3-bit timing indication defines whether a UL partial starting SF is configured for the transmission (non-option grant using, for example, codepoint "100" in Table 2-b), or a UL partial ending SF is configured for the transmission (non-option grant using, for example, codepoint "000" in Table 2-b), or at least two possible starting points and/or at least two possible ending points of the transmission are configured (option grant). The use of at least one of the possible starting points may depend on the outcome of a clear channel assessment procedure, such as a listen-before-talk procedure. In such an option grant the first starting point of the transmission may be defined by a UL partial ending subframe (for example, when codepoint "110" in Table 2-b is used in the option grant) or a Rel. 14 eLAA UL subframe (for example, when codepoint "111" in Table 2-b is used in the option grant), and the second starting point of the transmission may be defined by a UL partial starting subframe (for example, when codepoint "110" in Table 2-b is used in the option grant, the UL partial starting subframe according to codepoint "101" in Table 2-b).

3. Receive PUSCH transmission from the UE according to scheduling decision and information provided to the UE in the UL grant In case only a full subframe is scheduled (i.e. legacy Rel. 14, differentiation bit set to 0), the eNB tries to receive a Rel. 14 eLAA UL subframe (a PUSCH transmission of at least 12 symbols)

In case a partial ending subframe is scheduled (differentiation bit set to 1, e.g. states 000-011 of Table 2b), the eNB tries to identify and decode the PUSCH transmission in slot #0 according to the defined PUSCH start (given by the states 000-011)

In case the UL partial starting subframe is scheduled (differentiation bit set to 1, e.g. states 100 or 101 of Table 2b), the eNB tries to identify and decode the PUSCH partial ending subframe transmission in slot #1 according to the defined PUSCH end (given by the states 100 or 101).

In case two allocation options (e.g. either partial starting or partial ending subframe, or a full and a partial subframe) are scheduled by an option grant (differentiation bit set to 1, e.g. states 110 or 111 of Table 2b), the eNB will first check if the PUSCH by the UE is present in the first allocation option and, if identified, will try to decode the PUSCH according to the first allocation option. In case no PUSCH for the first allocation option has been identified in e.g. slot #0, the UE will try to identify the presence of the UE's PUSCH transmission according to the second allocation option (i.e. the partial starting subframe) and if identified, try to decode the PUSCH according to the second allocation option.

In detail, according to some embodiments of the invention, the UE may operate as follows:

1. Receive configuration information for partial starting and partial ending operation with option grants via e.g. RRC signalling.
2. Monitor on the DL control channel for further enhanced LTE LAA/MulteFire UL grants
 Compared to Rel. 14, the UL grant size may be increased by 1-bit to contain the differentiation flag between legacy PUSCH scheduling and UL partial starting/ending SF scheduling including option grant scheduling
 The UL grant may be either a dynamic one, signalled in each subframe, or a semi-persistent grant which is valid for an extended period of time e.g. in every $n^{th}$ subframe.

3. Depending on the 1-bit differentiation flag:
 If the bit indicates legacy behaviour (i.e. subframe scheduling granularity) operate the PUSCH as in case of legacy eLAA/Multefire operation
 If the bit indicates non-option grant UL partial starting/partial ending subframe scheduling or option grant scheduling, operate according to the behaviour described in steps 4-6
4. Prepare for the PUSCH transmission based on the received grant:
 4A: In case of either UL partial ending SF (for example, states "000" to "011" in Table 2-b), UL partial starting subframe (for example, states "100" to "101" in Table 2-b) or two (or more) allocation options with partial UL SFs (for example, state "110" in Table 2-b) are scheduled, the TBS determination takes the lower number of available PUSCH symbols into account. A TBS scaling similar as done for seven symbol UL sTTI or PUSCH transmission in UpPTS may be used.
 4B: In case two allocation options (using option grant) with a different number of symbols are scheduled, two options for the TBS determination exist. Here, as an example, a case is considered where an option grant includes as a first allocation option a Rel. 14 eLAA UL subframe and as a second allocation option a UL partial starting SF (state "111" of Table 2b). However, the principles may be applied to any resource allocation with different numbers of symbols for each allocation option.
  .i. 4B—Alternative 1: The TBS for both allocation options is defined by the first allocation option including a larger number of PUSCH symbols. In the example, the TBS is defined by the Rel. 14 eLAA UL subframe (i.e. no TBS scaling) and in case of transmission of the second allocation option, the larger TB is still transmitted in the lower number of SC-FDMA/PUSCH symbols. A more detailed discussion on this operation is included further below.
  .ii. 4B—Alternative 2: The TBS for both allocation options is defined by the second allocation option, i.e. the TBS is determined based on the lower number of PUSCH symbols. A TBS scaling similar to what is done for seven symbol UL sTTI or PUSCH transmission in UpPTS can be used. In some embodiments, UE determines the TBS according to the number of available symbols of the first allocation option for the case that it uses the first allocation option and determines the TBS according to the number of available symbols of the second allocation option for the case that it uses the second allocation option. In some embodiments, UE determines the TBS according to the number of available symbols of the second allocation option and uses this TBS regardless of whether it transmits at the first option or the second option. In this case, processing power at the UE is saved but bandwidth may be wasted if the first allocation option is used.
 The decision to operate the PUSCH TBS determination according to Alt. 1 or Alt. 2 can either be preconfigured (e.g. according to a 3GPP specification), dynamically indicated or configured by higher layers (e.g. part of the RRC configuration). More details on the trade-off and operation between these TBS determination modes is given further below, too.

5. In case either only UL partial starting or only partial ending subframe is scheduled using a non-option grant (i.e. states 000-101 of Table 2b):
   Perform the LBT/CCA procedure with the intent to start transmitting at the signalled starting timing.
   In case of successful LBT/CCA procedure, transmit the PUSCH in the scheduled UL partial subframe (either in slot #0 or in slot #1).
6. In case the UE is scheduled with two allocation options using an option grant (i.e. states 110-111 of Table 2b):
   The UE will perform LBT with the intent to start transmitting according to the first allocation option:
   In case the channel is available, the UE will transmit the PUSCH according to the first allocation option of the option grant. In the example of Table 2b:
   .i. If the signalling indicates "110": a UL partial ending subframe (i.e. in slot #0) is transmitted
   .ii. If the signalling indicates "111": the full UL subframe is transmitted
   In case the channel is not available for transmission according to the first allocation option in the subframe, the UE may continue trying access the channel (using LBT/CCA) until the start of the second allocation option, e.g. at the slot boundary. In case the channel access succeeds, the UE will transmit the PUSCH in the partial starting subframe according to the second allocation option (starting e.g. in symbol #7, i.e. in slot #1)

As discussed in the UE implementation section, two different TBS determination modes are possible if the granted (partial) subframes carry a different number of symbols. Hereinafter, the TBS determination is discussed at greater detail based on state "111" of Table 2b—combination of Rel. 14 eLAA UL subframe & Rel. 15 further enhanced LAA UL starting partial subframe but the same principles may be applied to other combinations of (partial) subframes in an option grant, too.

For the Alternative 1, the operation is optimized assuming the UE would be able to get access to the channel at the beginning of the subframe (is able to utilize the first allocation option). The TBS may be defined assuming a Rel. 14 UL subframe to be available. In case the transmission would then happen in the $2^{nd}$ allocation option (i.e. a partial UL subframe instead), less symbols (about ½) would be available to carry the PUSCH data. Nominally, not all the information bits may therefore fit into the partial UL subframe. Again, different alternatives are provided for the transmission in the $2^{nd}$ allocation option.

In Alternative 1-1, the UE may keep the determined modulation order the same and maps fewer information bits on the PUSCH SC-FDMA symbols, leading to an increase in the effective code rate by about a factor of 2.
   Note, that the eNB could take this jump in the effective code rate already into account when defining the MCS signaled in the option grant for the UL (i.e. by performing a rather conservative link adaptation so that the UL partial subframe decoding/decoding of the uplink signal at the $2^{nd}$ allocation option) could be successful.
In Alternative 1-2, the UE may use in case of transmission according to the second allocation option a higher modulation order to (partially) compensate for the reduced number of PUSCH REs (symbols) for the second (shorter) allocation option. The UE may adapt the modulation order to the next available level. For example, instead of QPSK the UE may apply 16QAM, instead of 16QAM 64QAM and for 256QAM-capable terminals, 256QAM may be used instead of 64QAM indicated in the DCI format. As the eNB will anyhow check for both different allocation options, the change in modulation order by the UE for transmission according to the second allocation option would be known to the eNB.

Again, the two sub-alternatives may be defined/fixed predefined (e.g. according to a 3GPP specification) or configured by a higher layer (e.g. as part of the RRC configuration). In some embodiments, the two alternatives may be combined. I.e., at the second allocation option, fewer information bits may be transmitted at a higher modulation order.

For the Alternative 2, the operation may be optimized/defined assuming the UE would not be able to get access to the channel at the earlier allocation option (e.g. at the beginning of the subframe) and may more probably use the second resource allocation option instead. In case the UE succeeds with the transmission on the first allocation option (i.e. on the Rel. 14 eLAA UL subframe in the example of Table 2b, state 111), the nominal code rate would be about half compared to the one given by the MCS directly. Similar as in the Alternative 1-1, the eNB may take this operation into account to achieve a good trade-off between reliability and performance by selecting a feasible MCS. In this respect, from operation point of view, the Alternative 1-1 and Alternative 2 are rather similar.

Figure 1:
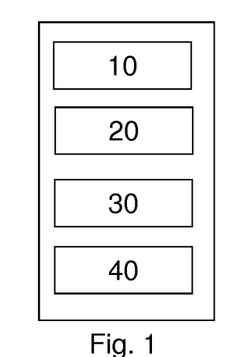
FIG. 1 shows an apparatus according to an embodiment of the invention.
Figure 2:
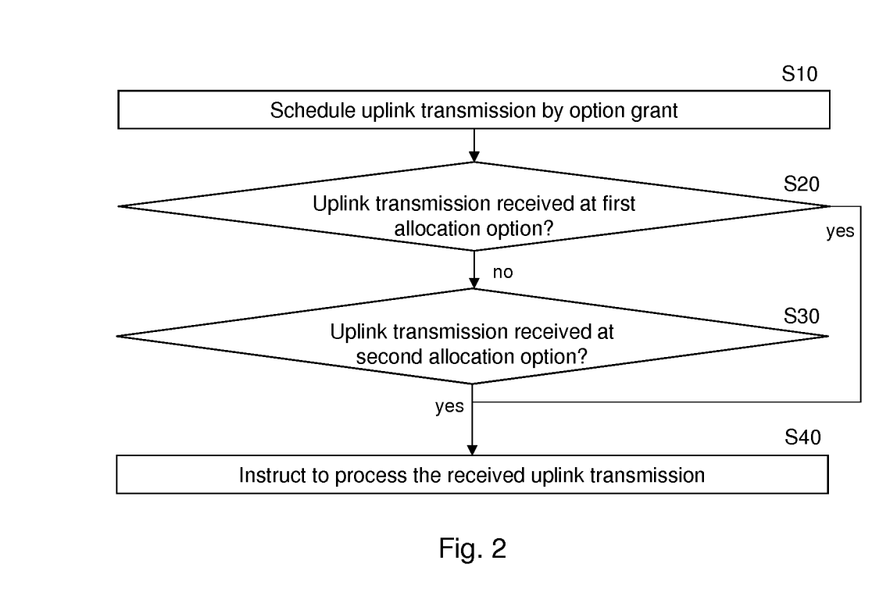
FIG. 2 shows a method according to an embodiment of the invention.

FIG. 1 shows an apparatus according to an embodiment of the invention. The apparatus may be a base station such as an eNB or an element thereof. FIG. 2 shows a method according to an embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises scheduling means 10, first checking means 20, second checking means 30, and instructing means 40. The scheduling means 10, first checking means 20, second checking means 30, and instructing means 40 may be a scheduling processor, first checking processor, second checking processor, and instructing processor, respectively.

The scheduling means 10 schedules an uplink transmission of a terminal by an option grant (S10). The option grant comprises, for a subframe, a first allocation option (resource allocation option) to start the uplink transmission and a second allocation option (resource allocation option) to start the uplink transmission. The first allocation option is earlier in the subframe than the second allocation option.

The first checking means 20 checks if the uplink transmission is received at the first allocation option (S20).

If the uplink transmission is not received at the first allocation option (S20="no"), the second checking means 30 checks if the uplink transmission is received at the second allocation option (S30).

If the uplink transmission is received at one of the first and second allocation options (S20="yes" or S30="yes"), the instructing means 40 instructs to process the received uplink transmission (S40), e.g. by demodulating the uplink transmission.

Figure 3:
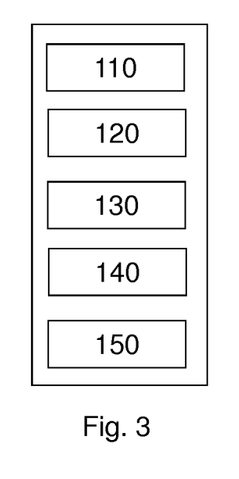
FIG. 3 shows an apparatus according to an embodiment of the invention.
Figure 4:
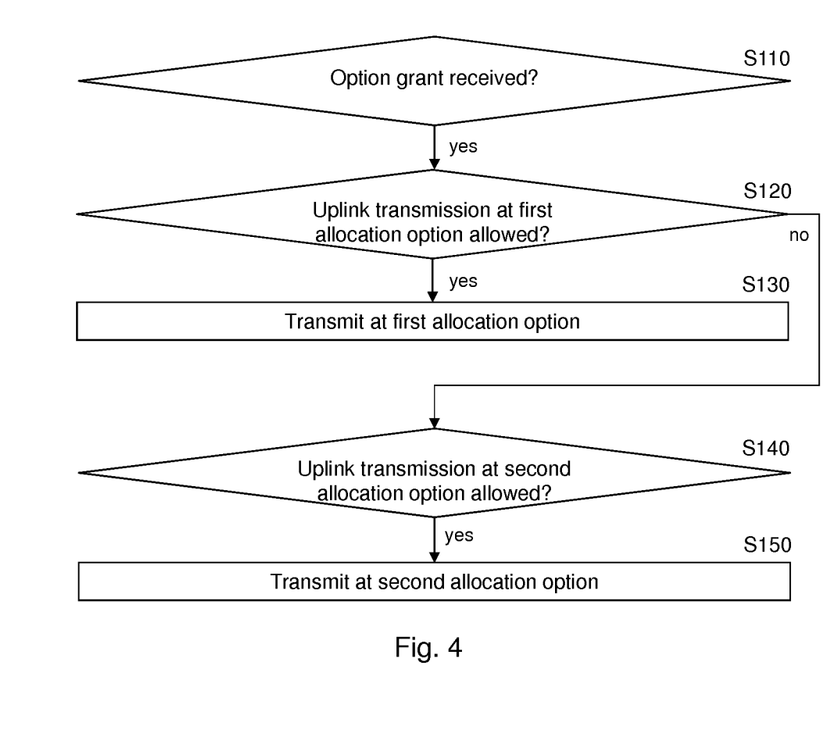
FIG. 4 shows a method according to an embodiment of the invention.

FIG. 3 shows an apparatus according to an embodiment of the invention. The apparatus may be a terminal such as a UE or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises checking means 110, first deciding means 120, first starting means 130, second deciding means 140, and second starting means 150. The checking means 110, first deciding means 120, first starting means 130, second deciding means 140, and second starting means 150 may be a checking processor, first deciding processor, first starting processor, second deciding processor, and second starting processor, respectively.

The checking means 110 checks if an option grant for an uplink transmission is received (S110). The option grant comprises, for a subframe, a first allocation option (resource allocation option) to start the uplink transmission and a second allocation option (resource allocation option) to start the uplink transmission. The first allocation option is earlier in the subframe than the second allocation option.

The first deciding means 120 decides if the uplink transmission is allowed at the first allocation option (S120). E.g. such decision may be met based on the result of a LBT procedure.

S110 and S120 may be performed in an arbitrary sequence or fully or partly in parallel to each other. In some embodiments, S120 may be performed only if the option grant is received (S110="yes").

If the option grant is received (S110="yes") and the uplink transmission is allowed at the first allocation option (S120="yes"), the first starting means 130 starts the uplink transmission at the first allocation option (S130). In some embodiments of the invention, the method ends after S130.

The second deciding means 140 decides if the uplink transmission is allowed at the second allocation option (S140). E.g. such decision may be met based on the result of a LBT procedure. In some embodiments, S140 is performed only if the uplink transmission is not started at the first allocation option (at least one of S110="no" and S120="no").

If the option grant is received (S110="yes"), the uplink transmission is not allowed at the first allocation option (S120="no"), and the uplink transmission is allowed at the second allocation option (S140="yes"), the second starting means 150 starts the uplink transmission at the second allocation option (S150).

Figure 5:
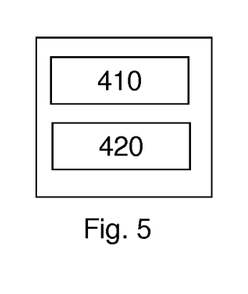
FIG. 5 shows an apparatus according to an embodiment of the invention.

FIG. 5 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 2 and 4.

Embodiments of the invention may be employed in a LTE-A network. They may be employed also in other mobile networks such as CDMA, EDGE, LTE, UTRAN networks etc., wherein the uplink transmission is scheduled by the base station. In addition to (un-)licensed band LTE, some embodiments of this invention may be applied to MulteFire.

The number of partial starting positions is not limited to two for an option grant. The number may be 2 or 3 or 4 or . . . , depending on the implementation. The number of partial ending positions is not limited to two for an option grant. The number may be 2 or 3 or 4 or . . . , depending on the implementation.

Depending on the number of states (number of different grants) the number of bits for indicating the states may vary. In particular, the number of states is not limited to 8. In some embodiments, eNB may provide only 1 type of grant which is an option grant. Preferably, the number of states (number of different grants) is $2^n$ with n=0 or 1 or 2 or 3 or . . . .

In some embodiments, all the potential grants may be option grants. For example, in such an embodiment, states 000 to 101 of Table 2b would define option grants, too.

Embodiments of the invention are described, wherein the UE decides based on the LBT mechanism whether it is allowed to transmit at the first or the second (third, fourth, . . . ) allocation option of an option grant. However, the invention is not limited to this criterion. If the UE receives an option grant and is prevented for some reason from utilizing the first allocation option for uplink transmission it may utilize the second (third, fourth, . . . ) allocation option instead. For example, the UE may not be allowed to use the first allocation option because the UE is busy with other UE internal processing at the first allocation option.

A terminal may be a user equipment such as a mobile phone, a smart phone, a PDA, a laptop, a tablet PC, a wearable, a machine-to-machine device, an Internet-of-Things device, or any other device which may be connected to the mobile network.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example a base station such as a eNodeB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a terminal such as a user equipment, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor;
at least one memory including computer program code; and
the at least one processor, with the at least one memory and the computer program code, being configured to cause the apparatus to perform at least
scheduling a first uplink transmission of a terminal by an option grant comprising, for a first subframe, a first allocation option to start the first uplink transmission and a second allocation option to start the first uplink transmission, wherein the first allocation option is earlier in the first subframe than the second allocation option;
checking if the first uplink transmission is received at the first allocation option;
checking if the first uplink transmission is received at the second allocation option if the first uplink transmission is not received at the first allocation option; and
instructing to process the first uplink transmission if the first uplink transmission is received at one of the first allocation option and the second allocation option.

2. The apparatus according to claim 1, wherein the at least one memory and the computer program code is further configured to cause the apparatus to perform
scheduling a second uplink transmission of the terminal by a non-option grant comprising, for a second subframe, only one third allocation option to start the second uplink transmission; and
causing reception of the second uplink transmission.

3. The apparatus according to claim 1, wherein the at least one memory and the computer program code is further configured to cause the apparatus to perform
indicating, to the terminal, at least one of that the first uplink transmission is scheduled using a signaling scheme supporting transmission of option grants and that the second uplink transmission is scheduled using a signaling scheme not supporting transmission of option grants.

4. The apparatus according to claim 1, wherein the at least one memory and the computer program code is further configured to cause the apparatus to perform
instructing the terminal to transmit a first number of information bits modulated by a first modulation order in the first uplink transmission if the terminal transmits the first uplink transmission at the first allocation option;
instructing the terminal to transmit a second number of information bits modulated by a second modulation order in the first uplink transmission if the terminal transmits the first uplink transmission at the second allocation option;
instructing to demodulate the first number of information bits received in the first uplink transmission with the first modulation order if the first uplink transmission is received at the first allocation option; and
instructing to demodulate the second number of information bits received in the first uplink transmission with the second modulation order if the first uplink transmission is received at the second allocation option; wherein
the second modulation order is equal to or higher than the first modulation order, and
the second number is smaller than the first number.

5. The apparatus according to claim 4, wherein the first modulation order is equal to the second modulation order.

6. The apparatus according to claim 1, wherein the at least one memory and the computer program code is further configured to cause the apparatus to perform
instructing the terminal to transmit a third number of information bits modulated by a third modulation order in the first uplink transmission if the terminal transmits the first uplink transmission at the first allocation option;
instructing the terminal to transmit a fourth number of information bits modulated by a fourth modulation order in the first uplink transmission if the terminal transmits the first uplink transmission at the second allocation option;
instructing to demodulate the third number of information bits received in the first uplink transmission with the third modulation order if the first uplink transmission is received at the first allocation option; and
instructing to demodulate the fourth number of information bits received in the first uplink transmission with the fourth modulation order if the first uplink transmission is received at the second allocation option; wherein
the fourth modulation order is higher than the third modulation order, and
the fourth number is equal to or smaller than the third number.

7. The apparatus according to claim 6, wherein the third number is equal to the fourth number.

8. The apparatus according to claim 1, wherein the third number is equal to the fourth number.

9. An apparatus, comprising:
at least one processor; and
at least one memory including computer program code;
the at least one processor, with the at least one memory and the computer program code being configured to cause the apparatus to at least perform at least
checking if an option grant for an uplink transmission is received, wherein the option grant comprises, for a subframe, a first allocation option to start the uplink transmission and a second allocation option to start the uplink transmission, wherein the first allocation option is earlier in the subframe than the second allocation option;
deciding if the uplink transmission is allowed at the first allocation option;
starting the uplink transmission at the first allocation option if the option grant is received and the uplink transmission is allowed at the first allocation option;
deciding if the uplink transmission is allowed at the second allocation option; and
starting the uplink transmission at the second allocation option if the option grant is received, the uplink transmission is not allowed at the first allocation option, and the uplink transmission is allowed at the second allocation option.

10. The apparatus according to claim 9, wherein the at least one memory and the computer program code is further configured to cause the apparatus to perform at least one of
listening if a resource for the uplink transmission is free at the first allocation option, wherein the deciding if the uplink transmission is allowed at the first allocation option decides that the uplink transmission is allowed at the first allocation option if the resource for the uplink transmission is free at the first allocation option; and listening if the resource for the uplink transmission is free at the second allocation option, wherein the deciding if the uplink transmission is allowed at the second allocation option decides that the uplink transmission is allowed at the second allocation option if the resource for the uplink transmission is free at the second allocation option.

11. The apparatus according to claim 9, wherein the at least one memory and the computer program code is further configured to cause the apparatus to perform monitoring if an indication is received, wherein the indication indicates that a base station controlling the uplink transmission does not provide the option grant;

inhibiting the checking if the option grant is received if the indication is received.

12. The apparatus according to claim 9, wherein the at least one memory and the computer program code is further configured to cause the apparatus to perform transmitting a first number of information bits with a first modulation order in the uplink transmission of the subframe if the uplink transmission is started at the first allocation option; and transmitting a second number of information bits with a second modulation order in the uplink transmission of the subframe if the uplink transmission is started at the second allocation option; wherein the second modulation order is equal to or higher than the first modulation order, and the second number is smaller than the first number.

13. The apparatus according to claim 12, wherein the first modulation order is equal to the second modulation order.

14. The apparatus according to claim 9, wherein the at least one memory and the computer program code is further configured to cause the apparatus to perform modulating the uplink transmission of a third number of information bits with a third modulation order if the uplink transmission starts at the first allocation option; and modulating the uplink transmission of a fourth number of information bits with a fourth modulation order if the uplink transmission starts at the second allocation option, wherein the fourth modulation order is higher than the third modulation order, and the fourth number is equal to or smaller than the third number.

15. The apparatus according to claim 9, wherein the third number is equal to the fourth number.

16. The apparatus according to claim 14, wherein the third number is equal to the fourth number.

17. A method, comprising:

scheduling a first uplink transmission of a terminal by an option grant comprising, for a first subframe, a first allocation option to start the first uplink transmission and a second allocation option to start the first uplink transmission, wherein the first allocation option is earlier in the first subframe than the second allocation option;

checking if the first uplink transmission is received at the first allocation option; and checking if the first uplink transmission is received at the second allocation option if the first uplink transmission is not received at the first allocation option; and instructing to process the first uplink transmission if the first uplink transmission is received at one of the first allocation option and the second allocation option.

18. A non-transitory computer readable medium storing a program of instructions, execution of which by a processor configures an apparatus to perform the method of claim 17.

19. A method, comprising:

checking if an option grant for an uplink transmission is received, wherein the option grant comprises, for a subframe, a first allocation option to start the uplink transmission and a second allocation option to start the uplink transmission, wherein the first allocation option is earlier in the subframe than the second allocation option;

deciding if the uplink transmission is allowed at the first allocation option;

starting the uplink transmission at the first allocation option if the option grant is received and the uplink transmission is allowed at the first allocation option;

deciding if the uplink transmission is allowed at the second allocation option; and starting the uplink transmission at the second allocation option if the option grant is received, the uplink transmission is not allowed at the first allocation option, and the uplink transmission is allowed at the second allocation option.

20. A non-transitory computer readable medium storing a program of instructions, execution of which by a processor configures an apparatus to perform the method of claim 19.

* * * * *